(12) United States Patent
Thomas et al.

(10) Patent No.: US 6,955,627 B2
(45) Date of Patent: Oct. 18, 2005

(54) MULTI-SPEED TRANSMISSION AND INTEGRATED DRIVE TRANSFER MECHANISM

(75) Inventors: Steven Thomas, Bloomfield Hills, MI (US); Matthew Hammond, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 48 days.

(21) Appl. No.: 10/797,868

(22) Filed: Mar. 10, 2004

(65) Prior Publication Data
US 2005/0202922 A1 Sep. 15, 2005

(51) Int. Cl.[7] ............................................. F16H 3/44
(52) U.S. Cl. ...................... 475/283; 475/269; 475/275; 475/276; 475/277; 475/278; 475/282; 475/288; 475/311; 192/51
(58) Field of Search ............................. 475/269, 275, 475/276, 277, 278, 282, 283, 288, 311; 192/51

(56) References Cited

U.S. PATENT DOCUMENTS

| 3,282,131 | A | * | 11/1966 | Smith .......................... 475/276 |
| 4,027,551 | A | * | 6/1977 | Murakami et al. .......... 475/276 |
| 5,944,630 | A | * | 8/1999 | Omote .......................... 477/5 |
| 5,989,146 | A | | 11/1999 | Brown et al. |
| 6,176,803 | B1 | | 1/2001 | Meyer et al. |
| 6,217,474 | B1 | | 4/2001 | Ross et al. |
| 6,425,841 | B1 | | 7/2002 | Haka |
| 6,746,357 | B1 | * | 6/2004 | Usoro et al. ................ 475/275 |
| 6,758,784 | B2 | * | 7/2004 | Lee et al. .................... 475/275 |

FOREIGN PATENT DOCUMENTS

| EP | 1091143 | 4/2001 | |
| EP | 1424510 | 2/2004 | |
| EP | 1435476 | 7/2004 | |
| EP | 1426656 | 9/2004 | |
| JP | 52077973 A | * 6/1977 | .......... F16H 03/62 |
| JP | 2001082555 | 3/2001 | |

* cited by examiner

Primary Examiner—Charles A Marmor
Assistant Examiner—David D. Le
(74) Attorney, Agent, or Firm—David B. Kelley; MacMillan, Sobanski & Todd

(57) ABSTRACT

A multiple speed transmission capable of producing five underdrive gear ratios, one direct drive ratio, four overdrive ratios, and four reverse ratios includes four interconnected planetary gearsets, multi-plate clutches and brakes controlling the gearset elements, and a coupler that changes between forward drive and reverse drive by holding and releasing alternate gearset components against rotation on the transmission case. The transmission in combination with a single-speed transfer case having either an on-demand transfer clutch, or a full-time all-wheel drive system, are formed in an integrated package.

14 Claims, 4 Drawing Sheets

| GEAR / CLUTCH | BRAKE 90 | CLUTCH 92 | CLUTCH 96 | BRAKE 98 | CLUTCH 100 | CLUTCH 104 | COUPLER 70 | OWC 108 | OWC 110 |
|---|---|---|---|---|---|---|---|---|---|
| FIRST | X | | | EB | EB | | F | X | X |
| SECOND | X | X | | | EB | | F | OR | X |
| THIRD | X | | X | | EB | | F | OR | X |
| FOURTH | | X | X | | EB | | F | OR | X |
| FIFTH | | X | | | EB | X | F | OR | X |
| SIXTH | | X | X | | | X | F | OR | OR |
| SEVENTH | X | | X | | | X | F | OR | OR |
| EIGHTH | X | X | | | | X | F | OR | OR |
| NINTH | X | | | X | | X | F | | OR |
| TENTH | | X | | X | | X | F | | OR |
| REV 1 | X | | | | | | R | X | - |
| REV 2 | X | X | | | | | R | OR | - |
| REV 3 | X | | X | | | | R | OR | - |
| REV 4 | | X | X | | | | R | OR | - |

FIG - 2

| GEAR / CLUTCH | BRAKE 90 | CLUTCH 92 | CLUTCH 96 | CLUTCH 100 | CLUTCH 104 | COUPLER 70 | OWC 110 |
|---|---|---|---|---|---|---|---|
| FIRST | x | x |  | EB |  | F | x |
| SECOND | x |  | x | EB |  | F | x |
| THIRD |  | x | x | EB |  | F | x |
| FOURTH |  | x |  | EB | x | F | x |
| FIFTH |  | x | x |  | x | F | OR |
| SIXTH | x |  | x |  | x | F | OR |
| SEVENTH | x | x |  |  | x | F | OR |
| REV1 | x | x |  |  |  | R | - |
| REV2 | x |  | x |  |  | R | - |
| REV3 |  | x | x |  |  | R | - |

FIG - 4

MULTI-SPEED TRANSMISSION AND INTEGRATED DRIVE TRANSFER MECHANISM

BACKGROUND OF THE INVENTION

1. Field of the Invention

This invention relates to geared, automatic power transmissions for motor vehicles. More particularly, it pertains to the kinematic arrangement for such transmissions and a driveline that incorporates them.

2. Description of the Prior Art

A transfer case contains a drive mechanism for connecting an engine to the vehicle's wheels, a primary wheel set that is connected continually to the engine, and a secondary wheel set that is connected selectively to the engine through the transfer case. A two-speed transfer case produces both a high range and a low range of speed ratios. Each of the speed ratios produced by the transmission is operative in each of the drive ranges produced by the transfer case; therefore, the transmission-transfer case can produce in combination a multiple of the transmission gear ratios. In this way the transfer case provides greater functional flexibility to the vehicle operator, who has a wider range of speed ratios to select depending on road conditions, towing load, vehicle speed, and other drive conditions.

Most operators of 4×4 vehicles, those vehicles having a driveline that transmits engine power to front and rear wheels, rarely operate the driveline in the Low Range, the range in which the lowest speed ratios are produced. A principal reason for this is the need to stop the vehicle before changing the drive state of a transfer case clutch that must be engaged in order to produce the Low Range. The wider range provided by new six speed automatic transmissions will likely cause still less frequent use of the Low Range, and decrease the need for two-speed transfer cases to meet the requirements of vehicle operators.

Certain vehicle lines require an overall transmission/transfer case gear ratio of approximately 12:1 in combination with relatively low engine speed, i.e. 2–3 mph @1000 rpm. Other vehicle lines have much less much less stringent requirements, i.e., lower gear ratios at low engine speed.

Automatic shifting under full torque from the low speed range to high speed range is a goal in driveline design, but the speed ratio step, from the low range to high range, in current transfer cases is too large for good shift quality and would need to be reduced to approximately 1.8 or less. However, performance degradation due to the resulting lower gear ratios would be undesirable. The use of multi-plate clutches in the transfer case to shift from low to high, coupled with six-speed automatic transmissions would result in added parasitic drag and lower fuel economy. In certain applications where a 12:1 overall transmission/transfer case speed ratio is required, a three-speed transfer case would be necessary with currently available six-speed automatic transmissions. But this would compound the losses.

SUMMARY OF THE INVENTION

A vehicle driveline having a transmission that produces eight to ten speed ratios in combination with a single speed transfer case according to the present invention is used to provide the extended speed ratio range needed to meet the diverse requirements of a various vehicle lines, and the ability to shift from the low range to high range under full torque. The combination ensures good shift quality and robust park system function.

A selector switch in a vehicle having a driveline according to the present invention might have 4×2, 4×4 High and 4×4 Low modes, but it could also have added functions like 4×4 Auto, Trailer Tow, and Snow modes. These modes are achieved by starting the transmission in first, second or third gear and by using a 4×4 on-demand clutch in Off, Stand-by and Applied modes. More than one reverse drive speed ratio would be available for each of these modes.

A coupler, such as a synchronizer is used to change between forward drive and reverse drive. The synchronizer improves fuel efficiency by eliminating two high-capacity, hydraulic friction clutches and their associated drag losses.

A transmission according to this invention is intended for use in four-wheel drive applications in combination with a single speed transfer case having either an on-demand transfer clutch, or a full time all-wheel-drive system. The transmission and transfer case can be packaged in a compact space no larger than required to accommodate a five-speed transmission and two-speed transfer case.

Although ten forward speed ratios and four reverse speed ratios are available, in normal, on-road use the transmission would function as a six-speed with one reverse speed. It is envisioned that a vehicle using this transmission would have several useful modes of operation, such as "4×2", "Auto", "4×4 Hi", "4×4 Low", "Snow" and "Trailer Tow". These modes would essentially select the first gear starting ratio, reverse ratio, and the state of the 4×4 on demand clutch in the transfer case.

A multiple-speed ratio automatic transmission for an automotive vehicle includes an input shaft; output shaft; a planetary gear system comprising first, second, third, and fourth planetary gear units, each gear unit having a sun gear, a ring gear, planet pinions meshing with the sun gear and ring gear, and a carrier rotatably supporting the planet pinions, the input shaft being connected driveably to the sun gear of the first gear unit, the output shaft being connected driveably to the carrier of the third gear unit, the sun gear of the third gear unit and the sun gear of the fourth gear unit being mutually driveably connected, the carrier of the first gear unit and ring gear of the second gear unit being mutually driveably connected, the carrier of the second gear unit and ring gear of the fourth gear unit being mutually driveably connected, the ring gear of the third gear unit and carrier of the fourth gear unit being mutually driveably connected; a coupler for alternately holding against rotation and releasing the carrier of the fourth gear unit and the sun gear of the fourth gear unit; a first brake for holding against rotation and releasing the sun gear of the second gear unit; a first clutch for driveably connecting and disconnecting the ring gear of the first gear unit and carrier of the second gear unit; a second clutch for driveably connecting and disconnecting the ring gear of the first gear unit and input shaft; a third clutch for driveably connecting and disconnecting the sun gear of the fourth gear unit and the coupler; and a fourth clutch for driveably connecting and disconnecting the sun gear of the first gear unit and ring gear of the third gear unit.

Various objects and advantages of this invention will become apparent to those skilled in the art from the following detailed description of the preferred embodiment, when read in light of the accompanying drawings.

BRIEF DESCRIPTION OF THE DRAWINGS

FIG. 2 is a chart that shows the pattern of engagement and release of the clutches, brakes, and couplings required to establish the forward drive and reverse drive ratios of the transmission mechanism of FIG. 1;

FIG. 4 is a chart that shows the pattern of engagement and release of the clutches, brakes, and couplings required to establish the forward drive and reverse drive ratios of the transmission mechanism of FIG. 3.

DETAILED DESCRIPTION OF THE PREFERRED EMBODIMENT

Figure 1:
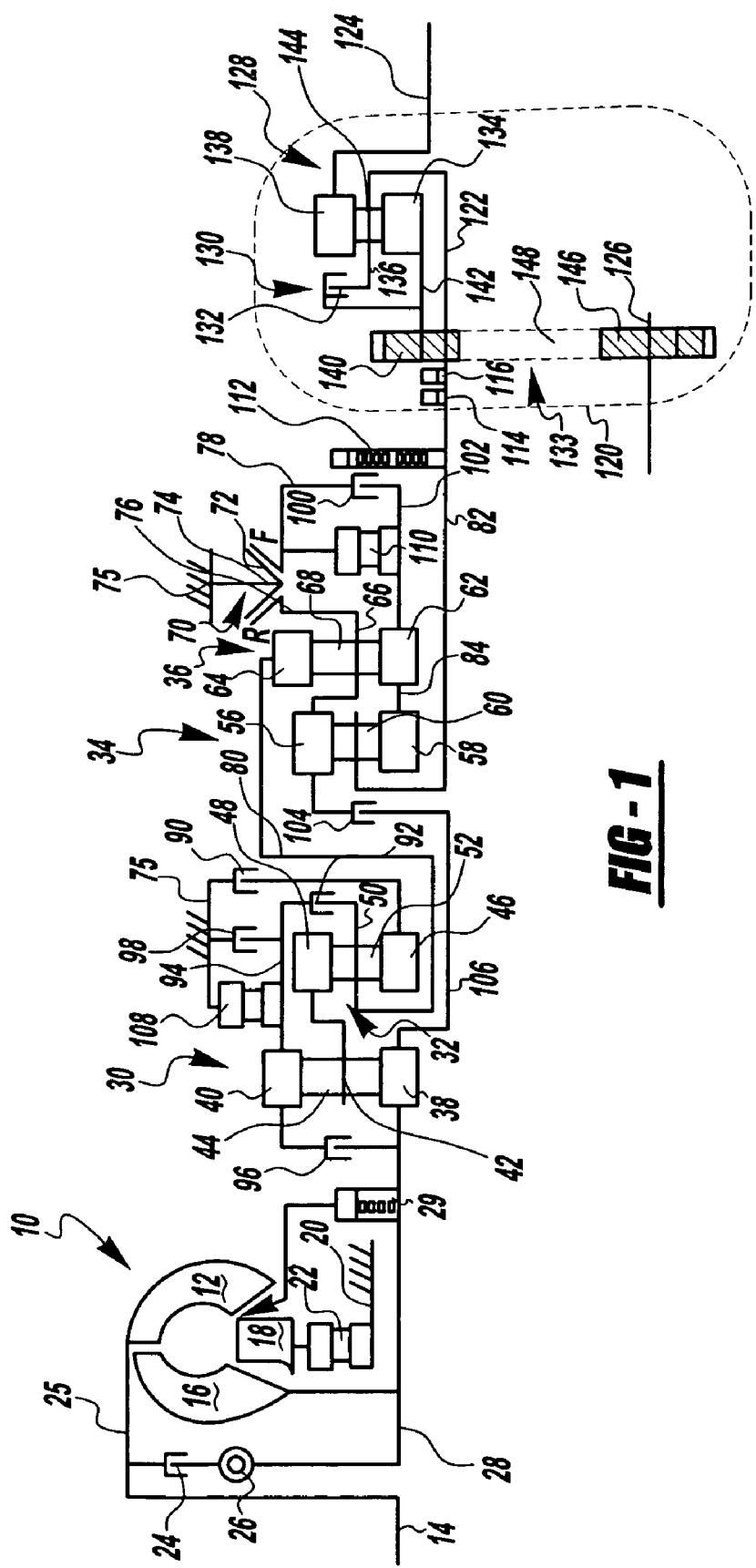
FIG. 1 is a schematic diagram of the kinematic arrangement of a transmission according to the present invention.

FIG. 1 shows a schematic diagram of a kinematic arrangement according to the present invention capable of producing ten forward speed ratios—five underdrive gear ratios, one direct drive ratio, and four overdrive ratios—and four reverse drive speed ratios. FIG. 2 shows the states of engagement and disengagement of various clutches and brakes corresponding to each speed ratio. The transmission arrangement of FIG. 1 includes four planetary gear sets, six multi-plate clutches and brakes that control the gearset elements, and a synchronizer for producing forward drive and reverse drive.

A hydrokinetic torque converter 10 includes an impeller 12 connected to the crankshaft 14 of an internal combustion engine, a bladed turbine 16, and a bladed stator 18. The impeller and turbine wheels define a toroidal fluid flow circuit, whereby the impeller is hydrokinetically connected to the turbine. The stator 18 is supported rotatably on a stationary stator sleeve shaft 20, and an overrunning brake 22 anchors the stator to the shaft 20 to prevent rotation of the stator in a direction opposite the direction of rotation of the impeller, although free-wheeling motion in the opposite direction is permitted.

The torque converter assembly includes a lockup clutch 24 located within the torque converter impeller housing 25. The torque output side of lockup clutch 24 includes a damper 26 located between the impeller and the turbine shaft, which is the transmission input shaft 28. When clutch 24 is engaged, the turbine and impeller are mechanically connected; when clutch 24 is disengaged, they are hydrokinetically connected and mechanically disconnected. The damper absorbs transitory torque fluctuations associated with engagement of a lockup clutch. Fluid to the torque converter is supplied from the output of an oil pump assembly 29.

Planetary gearing includes first, second, third, and fourth planetary gear units 30, 32, 34, and 36. The first gear unit 30 includes a sun gear 38, ring gear 40, carrier 42, and planetary pinions 44, supported by carrier 42 and in meshing engagement with sun gear 38 and ring gear 40. The second gear unit 32 includes a sun gear 46, ring gear 48, carrier 50, and planetary pinions 52, rotatably supported on carrier 50 and in meshing engagement with sun gear 46 and ring gear 48. A third gear unit 34 includes a sun gear 54, ring gear 56, carrier 58, and planetary pinions 60, rotatably supported on carrier 58 and in meshing engagement with sun gear 54 and ring gear 46. A fourth gear unit 36 includes a sun gear 62, ring gear 64, carrier 66, and planetary pinions 68, rotatably supported on carrier 66 and in meshing engagement with sun gear 62 and ring gear 64.

A coupler 70, which may be a dog clutch, but preferably is a synchronizer of the type used in a manual transmission for automotive use, includes a sleeve 72, supported on a hub 74 for axial sliding movement leftward and rightward. The hub is secured to the transmission case 75 against rotation. Preferably, sleeve 72 has a set of spline teeth formed on its inner surface, and hub 74 has a set of spline teeth on its outer surface continually engaged with those of the sleeve 72. Similarly, the spine teeth of sleeve 72 are aligned and engageable mutually with spline teeth on the outer surface of a disc 76, which is driveably connected to carrier 66. The spine teeth of sleeve 72 are aligned and engageable mutually with spline teeth on the outer surface of a second disc 78. When sleeve 72 is moved rightward to produce a drive connection between the case 75 and disc 78, the coupling 70 is in the forward drive state. When sleeve 72 is moved leftward to produce a drive connection between case 75 and disc 76, the coupling 70 is in the reverse drive state.

Carrier 50 is continually driveably connected by member 80 to ring gear 64; carrier 58 is continually driveably connected to transmission output 82; carrier 66 driveably connects ring gear 56 and disc 76; shaft 84 driveably connects sun gears 54 and 62; and carrier 42 is driveably connected to ring gear 48.

Hydraulically actuated clutches and brakes produce selected, releasable drive connections among the components of the kinematic arrangement. A brake 90 alternately connects and releases sun gear 46 and case 75; a clutch 92 alternately connects and releases carrier 50 and a drum 94 connected to ring gear 40; a clutch 96 alternately connects and releases ring gear 40 and transmission input 28; a brake 98 alternately connects and releases drum 94 and case 75; a clutch 100 alternately connects and releases disc 78 and shaft 102 which is connected to sun gears 54 and 62; and a clutch 104 alternately connects and releases ring gear 56 and sun gear 38 through intermediate shaft 106.

During operation in first gear, a one-way coupling 108 produces a one-way drive connection between case 75 and drum 94. During positive torque conditions, when power is transmitted from the engine through the transmission to the wheels, a one-way coupling 110 produces a one-way drive connection between coupler 70 and sun gear 62, and it overruns during negative torque conditions when power is transmitted from the wheels through the transmission to the engine. A principal purpose of clutch 100 is to produce, during negative torque conditions, the drive connection between coupler 70 and sun gear 62 that coupling 110 provides during positive torque conditions.

A gear selector lever, called a "PRNDL" controlled by the vehicle operator, is used to select the operating range of the transmission by moving the selector manually among positions where the various gear ranges are produced automatically and other positions where the gear ratios are produced manually. A park gear 112, carried on the output 82, is releasably fixed to the case 75 when the gear selector is moved to the "P" or Park position. This holds the shaft 82 against rotation, fixes the wheels to the case 75, and prevents the vehicle from moving.

Two low-pressure hydraulic pumps 114, 116 are mounted on the output shaft 82. Pump 114 has an inlet connected to the transmission oil sump, and an outlet, through which lubrication fluid is supplied to the transfer case 120. Pump 116 has an inlet in the oil sump of transfer case 120, and an outlet, which supplies oil to the transmission lubrication circuit. This lubrication source allows the vehicle to be "flat" towed, i.e., to be towed with all its wheels rotating in contact with the ground. The pump 116 keeps the transfer case sump dry, thereby reducing drag losses.

A transfer case 120 has a input 122, a primary output 124, a secondary output 126, a center planetary differential 128, a bias clutch 132, and a chain drive mechanism 133 for transferring power from an sun gear 134 of differential 128 to the output 126. The center differential 128 includes a carrier 136, a ring gear 138 connected to output 124, a sun gear 134 connected to a sprocket wheel 140 carried on shaft 142, and a set of planet pinions 144 supported rotatably on the carrier 136 and in meshing engagement with the ring gear 138 and sun gear 134. The chain drive mechanism 133 includes another sprocket wheel 146 supported on output shaft 126, and a drive chain 148 engaged with sprocket wheels 140 and 146.

In accordance with the relative size of the gears of the differential 128 and the magnitude of slip across clutch 132, the center differential 128 divides power carried on output shaft 82 between the primary transfer case output 124 and the secondary output 126. Slip across clutch 132 is a function of the extent to which that clutch is fully engaged, which is controlled by the magnitude of hydraulic pressure applied to a servo that actuates clutch 132.

FIG. 2 is a chart indicating the state of the clutches and brakes that are engaged and released selectively to produce each of the speed ratios. In FIG. 2, symbol "X" identifies an engaged friction clutch or friction brake, or a driving one-way coupling, a one-way clutch, or one-way brake. The symbol "O/R" indicates an overrunning condition for a one-way clutch or brake. The symbol "EB" indicates that the corresponding friction element is engaged during a coasting condition. The symbols "F" and "R" indicate the forward and reverse states of coupling 70. A blank indicates that the corresponding clutch or brake is disengaged or released.

First gear is achieved by moving sleeve 72 of coupler 70 rightward into engagement with disc 78, the forward drive position, and by applying brake 90. With the control elements so located and applied, one-way clutch 110 and one-way brake 108 are also engaged and driving during a positive torque condition, i.e., when power is transmitted from the input 28 through the transmission to the output 82. This first gear or lowest speed ratio would be used in the 4×4 "Low" range for the most severe off-road maneuvers, such as slowly surmounting obstacles, or ascending and descending steep grades.

An upshift to second gear is a non-synchronous shift event. Clutch 92 is engaged, brake 90 remains engaged, coupling 110 drives, but coupling 108 overruns. Second gear is roughly equivalent to the Low Range produced by most of the current transfer case systems. It would be used in 4×4 "Low" operation or as first gear ratio when trailer tow mode is selected.

Upshifts from second gear to third gear, and from third gear to fourth gear are synchronous shifts. The 2–3 upshift results by disengaging clutch 92, engaging clutch 96 and maintaining brake 90 engaged. Coupling 108 overruns, but coupling 110 can provide overrun capability for coasting downshifts and parking lot, low speed driving. The third speed ratio is the start-up speed ratio most often used in normal driving conditions. The 3–4 upshift results by disengaging brake 90, re-engaging clutch 92 and maintaining clutch 96 engaged.

The fourth gear to fifth gear upshift is a non-synchronous shift produced by disengaging clutch 96 and engaging clutch 104. The fifth gear to sixth gear upshift is a non-synchronous shift, clutch 96 is engaged, and coupling 110 overruns. All upshifts above sixth gear are synchronous. Fifth gear is an underdrive gear ratio, sixth gear is a direct drive 1:1 gear ratio, and seventh gear through tenth gear are the overdrive gear ratios. The step size between the gear ratios from sixth gear through tenth gear is small. Therefore, the six gears that would be used for most normal drive conditions include third, fourth, fifth, sixth, seventh and tenth, whose gear ratios preferably are $3^{rd}$=3.54:1, $4^{th}$=2.28:1, $5^{th}$=1.46:1, $6^{th}$=1.00:1, $7^{th}$=0.83:1, and $10^{th}$=0.63:1.

Reverse drive requires leftward movement of the sleeve 72 of coupler 70 to the reverse drive position where disc 76 is driveably connected to the case 75. Four reverse speed ratios can be produced using the same clutch and brake engagement and disengagement states as are used for the four lowest forward drive gears. The third reverse gear, whose gear ratio is preferably 2.73:1, would be used for normal 4×2 operation. The first reverse gear and second reverse gear would be used for off-road and trailer towing conditions.

Figure 3:
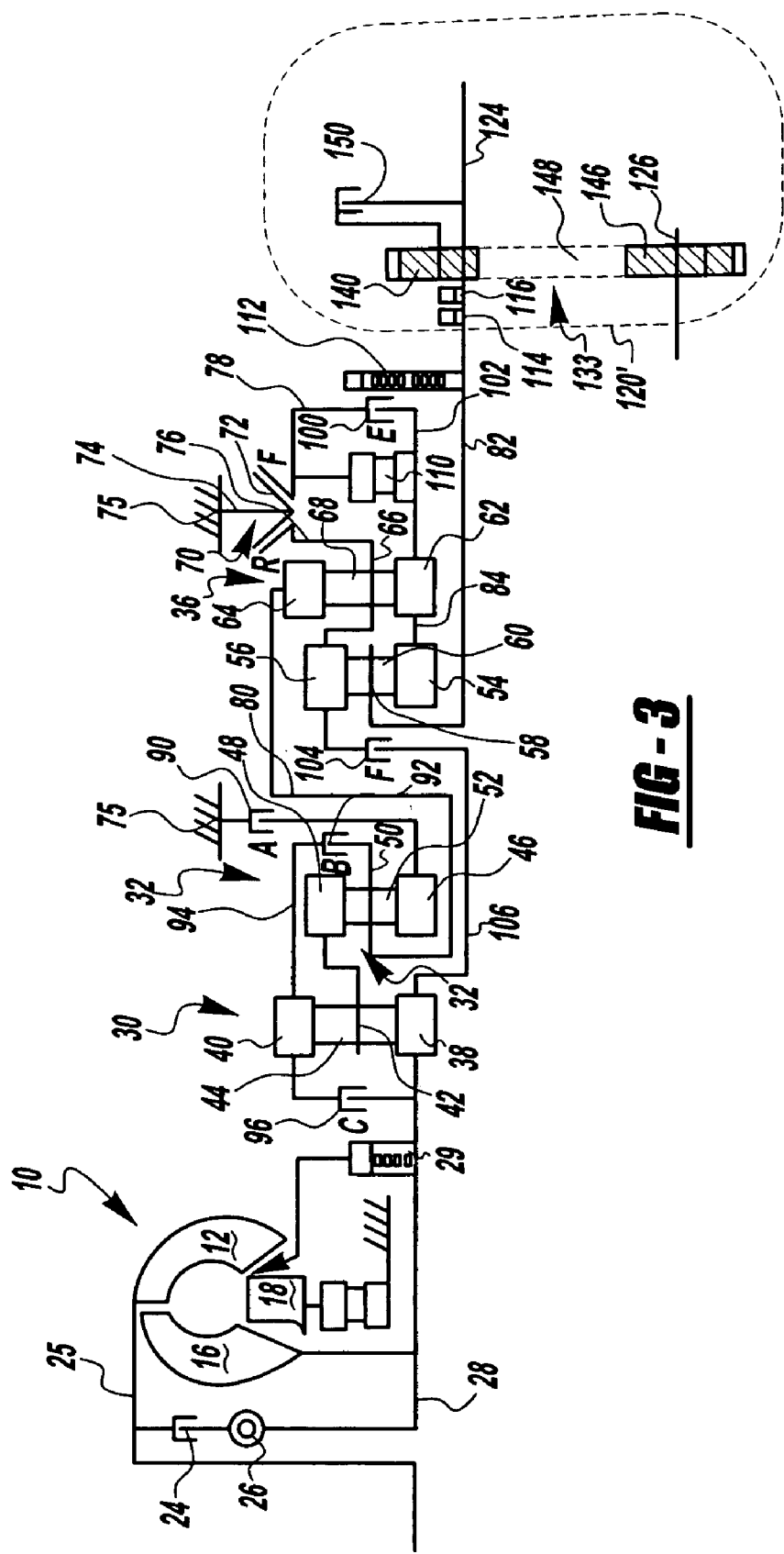
FIG. 3 is a schematic diagram of the kinematic arrangement of an alternate embodiment of the transmission according to this invention.

The kinematic arrangement shown in FIG. 3 produces seven forward speed ratios and avoids the lowest speed ratio produced by the arrangement of FIG. 1. The kinematic arrangement of FIG. 3 deletes brake 98 and coupling 108 from the arrangement of FIG. 1. It produces a first gear ratio that is approximately the same as the second gear ratio of the FIG. 1 arrangement, and it produces only three reverse gear ratios in the range 4.99:1–1.76:1. In a preferred embodiment, the overdrive ratios in sixth gear and seventh gear are 0.83:1 and 0.73:1, respectively. FIG. 4 is a chart indicating the engaged and released states of the clutches and brakes that selectively produce each of the speed ratios.

The transfer case 120' has a primary output 124, driveably connected to transmission output 82, a secondary output 126, a clutch 150, and a chain drive mechanism 133 for transferring power from output 124 to output 126. The chain drive mechanism 133 includes a first sprocket wheel 140, a second sprocket wheel 146 supported on output shaft 126, and a drive chain 148 engaged with sprocket wheels 140 and 146. Clutch 150 divides power carried on output shaft 82 between the primary transfer case output 124 and the secondary output 126. Slip across clutch 150 is a function of the extent to which that clutch is fully engaged, which is controlled by the magnitude of hydraulic pressure applied to a servo that actuates clutch 150.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A multiple-speed ratio automatic transmission for an automotive vehicle, comprising:
   an input shaft;
   output shaft;
   a planetary gear system comprising first, second, third, and fourth planetary gear units, each gear unit having a sun gear, a ring gear, planet pinions meshing with the sun gear and ring gear, and a carrier rotatably supporting the planet pinions;
   the input shaft being driveably connected to the sun gear of the first gear unit, the output shaft being driveably connected to the carrier of the third gear unit, the sun gear of the third gear unit and the sun gear of the fourth gear unit being mutually driveably connected, the carrier of the first gear unit and ring gear of the second gear unit being mutually driveably connected, the carrier of the second gear unit and ring gear of the fourth gear unit being mutually driveably connected, the ring gear of the third gear unit and carrier of the fourth gear unit being mutually driveably connected;
   a coupler for alternately holding against rotation and releasing the carrier of the fourth gear unit and the sun gear of the fourth gear unit;

a first brake for holding against rotation and releasing the sun gear of the second gear unit;

a first clutch for driveably connecting and disconnecting the ring gear of the first gear unit and carrier of the second gear unit;

a second clutch for driveably connecting and disconnecting the ring gear of the first gear unit and input shaft;

a third clutch for driveably connecting and disconnecting the sun gear of the fourth gear unit and the coupler; and a fourth clutch for driveably connecting and disconnecting the sun gear of the first gear unit and ring gear of the third gear unit.

2. The transmission of claim 1, wherein the third clutch further comprises:

a friction clutch having a first element driveably connected to the sun gear of the fourth gear unit, and a second element connected to the coupler; and an overrunning coupling arranged in parallel drive relationship with the friction clutch for producing a one-way drive connection between the coupler and the sun gear of the fourth gear unit.

3. The transmission of claim 1, further comprising:

a torque converter including an impeller driveably connected to a power source, and a turbine hydrokinetically coupled to the impeller and driveably connected to the input shaft.

4. The transmission of claim 1, further comprising a transfer mechanism including:

a second output shaft;

a first sprocket wheel;

a second sprocket wheel, spaced from the first sprocket wheel and driveably connected to the second output;

a drive chain engaged driveably with the first and second sprocket wheels; and a clutch for driveably connecting and releasing the first sprocket wheel and the output shaft.

5. The transmission of claim 1, wherein the coupler further comprises:

a hub secured against rotation; and a sleeve supported on the hub for axial sliding movement between a forward drive position where the sleeve driveably connects the hub and the third clutch, and a reverse drive position where the sleeve driveably connects the hub and the carrier of the fourth gear unit.

6. The transmission of claim 5, further comprising a transmission case fixed against rotation, and wherein the hub is secured to the transmission case.

7. A multiple-speed ratio automatic transmission for an automotive vehicle, comprising:

an input shaft;

output shaft;

a planetary gear system comprising first, second, third, and fourth planetary gear units, each gear unit having a sun gear, a ring gear, planet pinions meshing with the sun gear and ring gear, and a carrier rotatably supporting the planet pinions;

the input shaft being driveably connected to the sun gear of the first gear unit, the output shaft being driveably connected to the carrier of the third gear unit, the sun gear of the third gear unit and the sun gear of the fourth gear unit being mutually driveably connected, the carrier of the first gear unit and ring gear of the second gear unit being mutually driveably connected, the carrier of the second gear unit and ring gear of the fourth gear unit being mutually driveably connected, the ring gear of the third gear unit and carrier of the fourth gear unit being mutually driveably connected;

a coupler for alternately holding against rotation and releasing the carrier of the fourth gear unit and the sun gear of the fourth gear unit;

a first brake for holding against rotation and releasing the sun gear of the second gear unit;

a second brake for holding against rotation and releasing the sun gear of the first gear unit;

a first clutch for driveably connecting and disconnecting the ring gear of the first gear unit and carrier of the second gear unit;

a second clutch for driveably connecting and disconnecting the ring gear of the first gear unit and input shaft;

a third clutch for driveably connecting and disconnecting the sun gear of the fourth gear unit and the coupler; and a fourth clutch for driveably connecting and disconnecting the sun gear of the first gear unit and ring gear of the third gear unit.

8. The transmission of claim 7, further comprising a transmission case fixed against rotation, and wherein the second brake further comprises:

a friction brake having a first element driveably connected to the sun gear of the first gear unit, and a second element driveable connected to the transmission case; and an overrunning coupling arranged in parallel drive relationship with the friction brake clutch, for producing a one-way drive connection between the sun gear of the first gear unit and the transmission case.

9. The transmission of claim 7, further comprising a transmission case fixed against rotation, and wherein the second brake further comprises:

an overrunning coupling for producing a one-way drive connection between the sun gear of the first gear unit and the transmission case.

10. The transmission of claim 7, further comprising a transmission case fixed against rotation, and wherein the second brake further comprises:

a friction brake having a first element driveably connected to the sun gear of the first gear unit, and a second element driveable connected to the transmission case.

11. The transmission of claim 7, further comprising:

a torque converter including an impeller driveably connected to a power source, and a turbine hydrokinetically coupled to the impeller and driveably connected to the input shaft.

12. The transmission of claim 7, further comprising a transfer mechanism including:

a second output shaft;

a first sprocket wheel;

a second sprocket wheel, spaced from the first sprocket wheel and driveably connected to the second output;

a drive chain engaged driveably with the first and second sprocket wheels;

a clutch for driveably connecting and releasing the first sprocket wheel and the output shaft.

13. The transmission of claim 7, wherein the coupler further comprises:

a hub secured against rotation; and a sleeve supported on the hub for axial sliding movement between a forward drive position where the sleeve driveably connects the hub and the third clutch, and a reverse drive position where the sleeve driveably connects the hub and the carrier of the fourth gear unit.

14. The transmission of claim 13, wherein the hub is secured to the transmission case.

* * * * *